United States Patent [19]

Sato

[11] Patent Number: 5,192,036
[45] Date of Patent: Mar. 9, 1993

[54] TWO-BEARING REEL
[75] Inventor: Jun Sato, Sakai, Japan
[73] Assignee: Shimano, Inc., Osaka, Japan
[21] Appl. No.: 663,615
[22] Filed: Mar. 4, 1991
[30] Foreign Application Priority Data Mar. 12, 1990 [JP] Japan .................. 2-25446[U]

[51] Int. Cl.$^5$ .................. A01K 89/015; A01K 89/00
[52] U.S. Cl. .................. 242/268; 242/290
[58] Field of Search ............ 242/268, 267, 290, 223

[56] References Cited

U.S. PATENT DOCUMENTS

| 1,967,678 | 7/1934 | Miller | 242/268 |
| 2,485,741 | 10/1949 | King | 242/268 X |
| 3,829,041 | 8/1974 | Nepote | 242/268 X |
| 4,142,694 | 3/1979 | Rankin | 242/268 X |
| 4,513,925 | 4/1985 | Yamaguchi | 242/245 |
| 4,901,944 | 2/1990 | Aoki | 242/268 X |
| 4,966,335 | 10/1990 | Kaneko | 242/268 X |

FOREIGN PATENT DOCUMENTS 63-68774  5/1988  Japan .

Primary Examiner—Daniel P. Stodola
Assistant Examiner—William Stryjewski
Attorney, Agent, or Firm—Dickstein, Shapiro & Morin

[57] ABSTRACT

A two-bearing reel having an anti-slack mechanism, mounted between a drag adjustment control member and a pressing member, which allows the drag adjustment control member to be operated only when an operational force exceeding a predetermined value is applied to the drag adjustment control member and which otherwise maintains the drag adjustment control member in an adjusted position.

6 Claims, 2 Drawing Sheets

TWO-BEARING REEL

FIELD OF THE INVENTION

The present invention relates to a two-bearing reel, and more particularly to a two-bearing reel provided with a drag adjustment control member.

DESCRIPTION OF THE RELATED ART

Conventionally, with the two-bearing reel of the above-noted type, a drag force is varyingly adjusted only by controlling the drag adjustment control member.

However, since a frequently repeated winding-up operation possibly causes the drag to slacken, the reel of this type is not always easy to handle in operation.

A primary object of the present invention is to provide a two-bearing reel capable of restraining slack of the drag as much as possible by a simple improvement in a drag structure.

SUMMARY OF THE INVENTION

In order to achieve the above-noted object, a two-bearing reel according to the present is characterized by an anti-slack mechanism for a drag mechanism mounted between a drag adjustment control member and a pressing member acting upon the drag mechanism by controlling the drag adjustment control member to allow the drag adjustment control member to be operated with an operational force exceeding a predetermined value and to fix the drag adjustment control member to an adjusted position, wherein the anti-slack mechanism includes an engaging element having an elastic engaging projection and a plurality of engaging recesses for engaging the elastic engaging projection, wherein the engaging element is detachably attached to the drag adjustment control member, and wherein the plurality of engaging recesses are defined in the pressing member.

A Function and an effect of the two-bearing reel relating to the present invention are as follows.

A drag force can be varied by controlling the drag adjustment control member with an operational force exceeding an engaging force between the elastic engaging projection and the engaging recess while the drag adjustment control member cannot be operated with an operational force less than the engaging force, i.e. can be maintained in position through the anti-slack mechanism when an external force less than the engagement force is applied.

Therefore, the drag adjusting force can be restrained as much as possible even if a winding-up operation is frequently repeated.

Further, the engaging element is detachable and thus easily replacable with new one if the elastic engaging projection is deteriorated in its elastic force, or damaged or deformed after the long-term use.

As a result, re-arrangement of the drag force is not necessary because slack of the drag mechanism can be restrained, which enhances an operational efficiency. Also, since the engaging element can be easily replaced by new one, the parts exchange can be minimum even after the long-term use.

Particularly, the engaging element acting as the engaging projection is maintained through a retaining ring thereby to reliably prevent disengagement of the engaging element, which can advantageously dispense with re-attachment of the engaging element to a boss portion.

Other objects, features and advantages of the present invention will be apparent from the following description.

BRIEF DESCRIPTION OF THE DRAWINGS

The drawings illustrate a two-bearing reel embodying the present invention in which.

DETAILED DESCRIPTION OF THE PREFERRED EMBODIMENTS

A two-bearing reel according to the present invention will be described in detail referring to the accompanying drawings.

Figure 1:
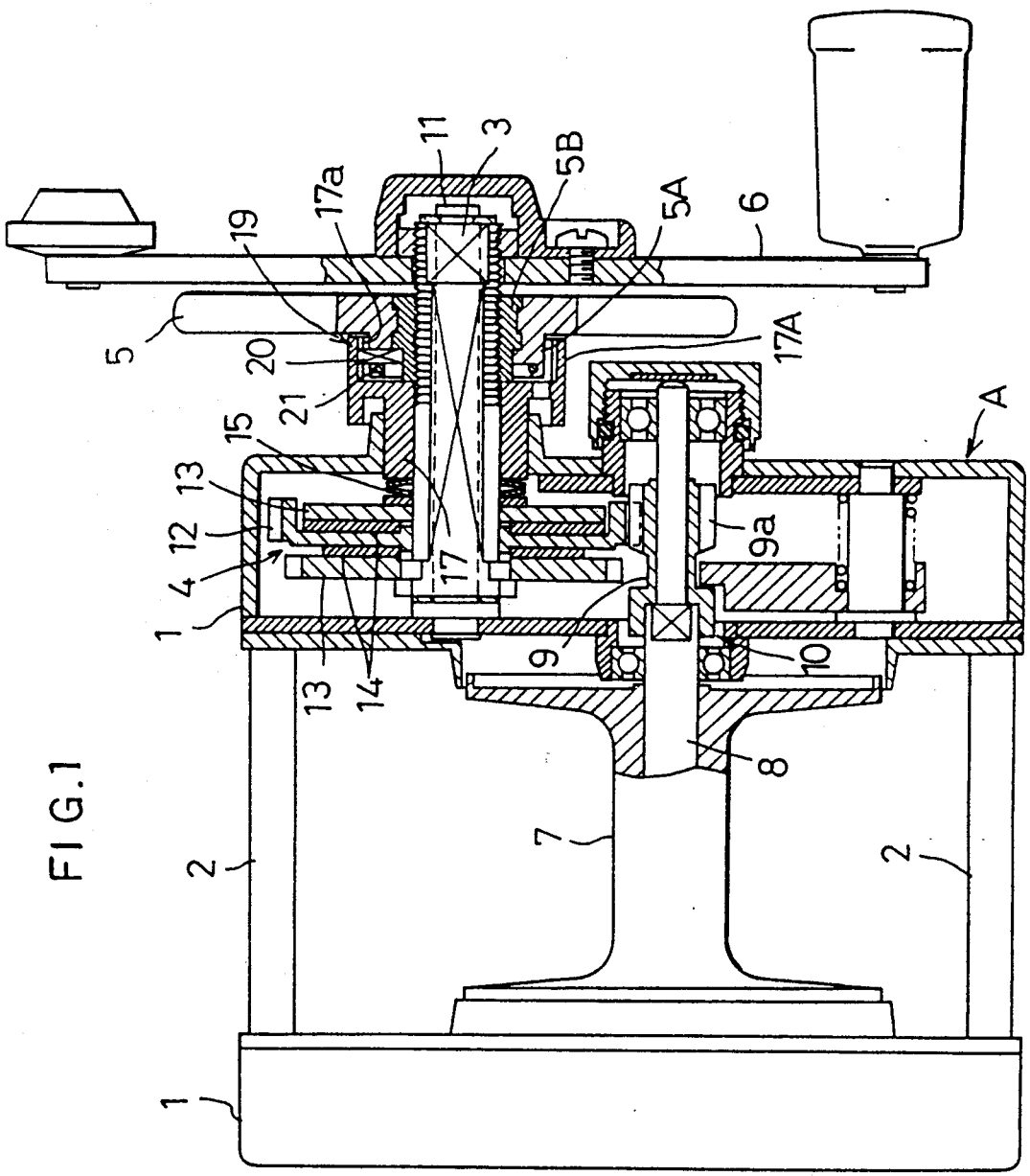
FIG. 1 is a partially broken away front view of the two-bearing reel.

As shown in FIG. 1, the two-bearing reel relating to the present invention comprises a reel body A including right and left side cases 1 interconnected through rods 2, a spool 7 disposed between the right and left side cases 1, a handle shaft 3 extending from the right side case 1, and a drag mechanism 4, a drag adjustment control member 5 and a handle for taking up a fishing line 6, three of which are attached to the handle shaft 3, respectively.

A structure for driving the spool in the handle 6 will be described next. A rotatable spool shaft 8 is pivotably supported at one end within the right side case 1. An input shaft 9 is loosely fitted on the one end of the rotatable spool shaft 8. A fitting type clutch 10 is defined between the one end of the input shaft 9 and the rotatable spool shaft 8.

The drag mechanism 4 will be set forth below. The handle shaft 3 is hollow and has a support shaft 11 inserted therein. The support shaft 11 is supported by the right side case 1 whereby the handle shaft 3 is indirectly supported by the right side case 1. The drag mechanism 4 includes a drive gear 12 loosely fitted on the handle shaft 3, pressure plates 13 and friction plates 14 disposed in opposite sides of the drive gear 12, and a pressure spring 15. A pressing member 17 acting upon the drag mechanism 4 is attached adjacent an outer end portion of the handle shaft 3 relative to the drag mechanism 4 to be rotatable in unison with the handle shaft 3 and slidable in an axial direction of the handle shaft. A drag adjustment control member 5 is mounted to be screwed down on a further outer end portion of the handle shaft 3 relative to the pressing member 17.

As the drag adjustment control member 5 is screwed on, the pressing member 17 slides on the handle shaft 3 to press the drag mechanism 4 thereby to enhance a friction retaining force as well as intensify the integrality between the drive gear 12 and the handle shaft 3, as a result of which a drag force applying state is established.

Figure 2:
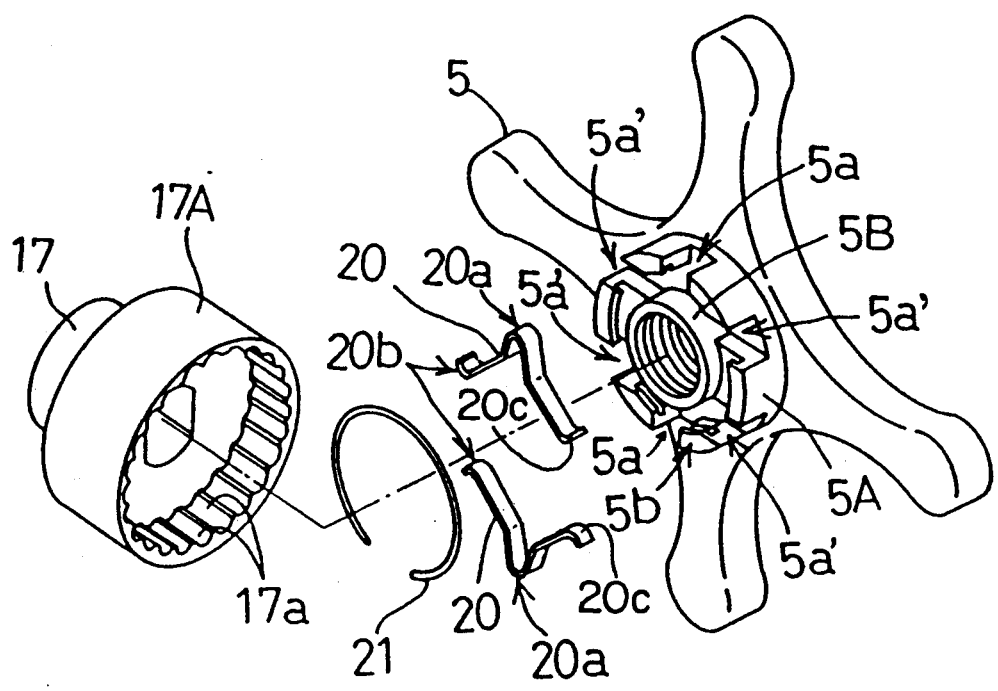
FIG. 2 is an exploded perspective view showing an anti-slack mechanism for a drag.
Figure 3:
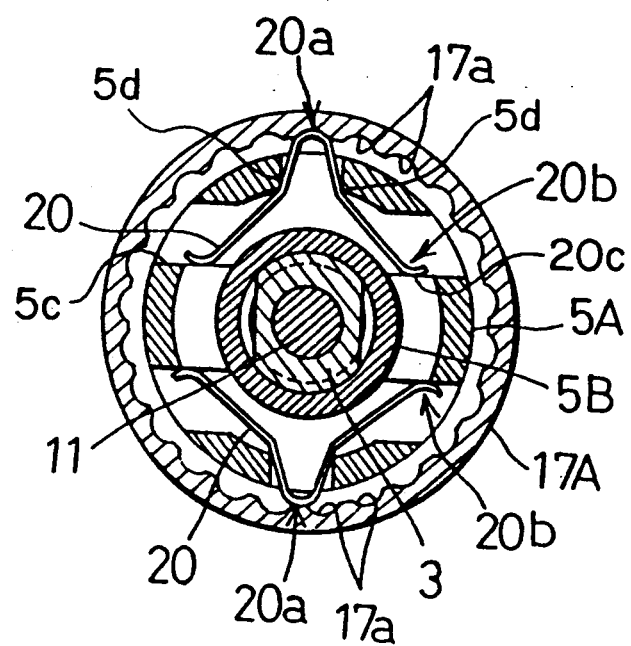
FIG. 3 is a vertical section showing the anti-slack mechanism for the drag.

An anti-slack mechanism 19 for the drag defined between the drag adjustment control member 5 and the pressing member 17 will be described hereinafter. As can be seen from FIGS. 2 and 3, a large boss portion 5A and a small boss portion 5B coaxially project from the drag adjustment control member 5. The large projecting boss portion 5A has an outer diameter to fit into a projecting boss 17A of the pressing member 17. The small projecting boss portion 5B defines a threaded portion in an inner periphery thereof to screw to the handle shaft 3. The large projecting boss portion 5A peripherally defines six recesses 5a. As seen from FIG. 2, an elastic deformable engaging element 20 made of sheet metal is mounted between the opposite recesses 5a' across the top recess 5a. More particularly, a foldback portion of the engaging element 20 acting as an elastic engaging projection is inserted into the top recess 5a whereby to a top end of the engaging element 20 projects from the recess and opposite end legs 20b of the engaging element 20 are supported by the opposite recesses 5a', respectively. As illustrated in FIGS. 2 and 3, contact surfaces 20c of the element 20 are in contact with contact surfaces 5c of the second recesses 5a'. The legs 20b of the element 20 are in contact with corners 5d of the first recesses 5a. Thus, the engaging element 20 is removably attached to the drag adjustment control member 5.

Another engaging element 20 can be mounted between the remaining three recesses 5a and 5a' defined in the large boss portion 5A to be substantially symmetric to the upper engaging element 20. The top and bottom recesses 5a do not oppose to each other by 180°, but are displaced from each other by half a pitch of a plurality of the engaging recesses 17a described hereinafter. The projecting boss portion 17A of the pressing member 17 has an inner periphery circumferentially defining the plurality of engaging recesses 17a. The engaging projection 20a of the engaging element 20 can be inserted into one of the engaging recesses 17a.

The drive gear 12 is constantly meshed with a gear portion 9a of the input shaft 9 whereby the spool 7 is rotatably driven from the handle shaft 3.

Thus, when the drag adjustment control member 5 is rotated, a drag force can be adjusted to a predetermined value. The drive gear 12 is freely rotated with an unwinding force of the fishing line exceeding the predetermined value thereby to lock the handle shaft 3 against rotation. In addition, since the engaging projection 20 is engaged with the engaging recess 17a, the drag force does not vary if an external force to be applied is less than the engaging force therebetween. Thus, the antislack mechanism 19 for the drag mechanism 4 functions by the engaging projection 20a and the engaging recess 17a in which the drag adjustment control member 5 is controlled with an operational force exceeding the engaging force between the engaging recess 17a and the engaging projection 20a whereby the engaging projection 20a is shifted to engage the adjacent engaging recess 17a to increase the drag force. As the drag adjustment control member 5 is operated, a light elastic vibration noise (click noise) can be generated by movement of the engaging projection 20a to provide the angler with a solid sense of controlling the drag adjustment control member. As described hereinbefore, the two engaging projections 20a are displaced from each other in the opposite phase by half a pitch with respect to the engaging recess 17a, which can continuously generate the click noise from the two engaging elements 20.

Numeral 21 indicated in FIGS. 2 and 3 denotes a retaining ring for preventing the engaging elements 20 from disengaging from the projecting boss portion 5A.

With the above-described structure, the engaging recesses 17a defined in the pressing member 17 can be readily visually recognized from the end of the handle shaft in assembling the drag mechanism 4, which makes it easy to engage the engaging projection 20a of the engaging element 20 attached to the drag adjustment control member 5 into one of the engaging recess 17a thereby to facilitates an assembling process of the drag mechanism.

Other embodiments will be described below.

(1) The engaging element 20 may be defined to apply a elastic force only to the elastic engaging projection 20a.

(2) The friction plates 14, the pressure plates 13 and the pressure spring 15 of the drag mechanism 4 may be suitably varied in number, in shape and in arrangement.

What is claimed is:

1. A two-bearing reel comprising:
   a drag adjustment control member,
   a pressing member acting upon a drag mechanism in response to movement of the drag adjustment control member, and
   an anti-slack mechanism for the drag mechanism mounted between the drag adjustment control member and the pressing member to allow the drag adjustment control member to be operated with an operational force exceeding a predetermined value and to fix the drag adjustment control member to an adjusted position,
   wherein said anti-slack mechanism includes an engaging element having an elastic engaging projection and a plurality of engaging recesses for engaging the elastic engaging projection,
   said engaging element including at a center position thereof a fold-back portion acting as said engaging projection to be inserted into a first recess peripherally defined in a boss portion projecting from the drag adjustment control member, said first recess including corners, and said engaging element further including an opposed pair of flared end legs supported respectively on contact surfaces in second recesses peripherally defined in said boss portion whereby said engaging element is removably attached to the drag adjustment control member,
   said engaging element and engaging recesses creating the predetermined operational force for operating the drag adjustment control member, said flared end legs including contact surfaces, said engaging projecting being located between said end legs,
   said plurality of engaging recesses being defined in the pressing member, and
   wherein said engaging element is made of resiliently deformable sheet metal, said engaging element being substantially V-shaped, said contact surfaces of said flared end legs being in contact with said contact surfaces of said second recesses, and wherein said legs of said engaging element are in contact with said corners of said first recesses.

2. A two-bearing reel as claimed in claim 1 wherein said engaging element is attached to the drag adjustment control member in a pair to be substantially symmetric to each other.

3. A two-bearing reel as claimed in claim 2, wherein said boss portion includes a retaining ring attached thereto for preventing the engaging elements from disengaging from the boss portion.

4. A two-bearing reel as claimed in claim 1, wherein said boss portion includes a retaining ring attached thereto for preventing the engaging element from disengaging from the boss portion.

5. A two-bearing reel comprising:
   a drag adjustment control member, a pressing member acting upon a drag mechanism in response to movement of the drag adjustment control member, and an anti-slack mechanism for the drag mechanism mounted between the drag adjustment control member and the pressing member to allow the drag adjustment control member to be operated with an operational force exceeding a predetermined value and to fix the drag adjustment control member to an adjusted position, wherein said anti-slack mechanism includes an engaging element having an elastic engaging projection and a plurality of engaging recesses for engaging the elastic engaging projection, said engaging element including at a center position thereof a fold-back portion acting as said engaging projection to be inserted into a first recess peripherally defined in a boss portion projecting from the drag adjustment control member and said engaging element further including an opposed pair of end legs supported respectively in second recesses peripherally defined in said boss portion whereby said engaging element is removably attached to the drag adjustment control member, said engaging element and engaging recesses creating the predetermined operational force for operating the drag adjustment control member, wherein said plurality of engaging recesses are defined in the pressing member, wherein said engaging element is made of resiliently deformable sheet metal, wherein said engaging element is attached to the drag adjustment control member in a pair to be substantially symmetric to each other, and wherein said engaging projections of the two engaging elements are displaced from each other by half a pitch of the plurality of engaging recesses whereby one of the engaging projections engages one of the engaging recesses.

6. A two-bearing reel as claimed in claim 5, wherein said boss portion includes a retaining ring attached thereto for preventing the engaging elements from disengaging from the boss portion.

* * * * *